(12) United States Patent
Yamahira et al.

(10) Patent No.: US 11,391,662 B2
(45) Date of Patent: Jul. 19, 2022

(54) RAW MATERIAL PARTICLE SIZE DISTRIBUTION MEASURING APPARATUS, PARTICLE SIZE DISTRIBUTION MEASURING METHOD, AND POROSITY MEASURING APPARATUS

(71) Applicant: JFE Steel Corporation, Tokyo (JP)

(72) Inventors: Naoshi Yamahira, Tokyo (JP);
Takahiro Nishino, Tokyo (JP);
Takehide Hirata, Tokyo (JP); Kazuro Tsuda, Tokyo (JP); Toshiki Tsuboi, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 389 days.

(21) Appl. No.: 16/498,110

(22) PCT Filed: Mar. 30, 2018

(86) PCT No.: PCT/JP2018/013742
§ 371 (c)(1),
(2) Date: Sep. 26, 2019

(87) PCT Pub. No.: WO2018/181942
PCT Pub. Date: Oct. 4, 2018

(65) Prior Publication Data
US 2021/0102885 A1 Apr. 8, 2021

(30) Foreign Application Priority Data
Mar. 30, 2017 (JP) .............................. JP2017-067152

(51) Int. Cl.
*G01N 15/08* (2006.01)
*G01N 15/02* (2006.01)
*G01N 15/14* (2006.01)

(52) U.S. Cl.
CPC ....... *G01N 15/088* (2013.01); *G01N 15/1475* (2013.01); *G01N 2015/025* (2013.01);
(Continued)

(58) Field of Classification Search
CPC ......... G01N 15/0227; G01N 2015/025; G01N 15/088
See application file for complete search history.

(56) References Cited

U.S. PATENT DOCUMENTS

| | | | |
|---|---|---|---|
| 2005/0248762 A1 | 11/2005 | Lehtikoski et al. | |
| 2007/0019195 A1 | 1/2007 | Totoki | |
| 2013/0013271 A1* | 1/2013 | Aikawa | C04B 20/0076 703/2 |

FOREIGN PATENT DOCUMENTS

| | | | |
|---|---|---|---|
| JP | 05164677 A | 6/1993 |
| JP | 06288892 A | 10/1994 |
| JP | 2000329683 A | 11/2000 |
| JP | 2001337028 A | 12/2001 |
| JP | 2007024783 A | 2/2007 |
| JP | 2009036533 A | 2/2009 |
| JP | 2013019731 A | 1/2013 |

(Continued)

OTHER PUBLICATIONS

International Search Report and Written Opinion for International Application No. PCT/JP2018/013742, dated Jun. 19, 2018—7 pages.

(Continued)

*Primary Examiner* — Paul M. West
(74) *Attorney, Agent, or Firm* — RatnerPrestia

(57) ABSTRACT

Provided are a raw material particle size distribution measuring apparatus and a particle size distribution measuring method. Also provided is a porosity measuring apparatus. The raw material particle size distribution measuring apparatus includes: a coarse particle measuring device that acquires information indicating the particle size distribution of the coarse particles; a fine particle measuring device that acquires information indicating the particle size distribution of the fine particles; and an arithmetic device that computes the particle size distribution of the coarse particles using the information indicating the particle size distribution of the (Continued)

coarse particles, computes the particle size distribution of the fine particles using the information indicating the particle size distribution of the fine particles, and computes an overall particle size distribution of the raw material using the particle size distribution of the coarse particles and the particle size distribution of the fine particles.

15 Claims, 4 Drawing Sheets

(52) U.S. Cl.
CPC .................. *G01N 2015/144* (2013.01); *G01N 2015/1465* (2013.01)

(56) References Cited

FOREIGN PATENT DOCUMENTS

| | | | |
|---|---|---|---|
| JP | 2013257188 | A * | 12/2013 |
| JP | 2014025720 | A | 2/2014 |
| JP | 2014092494 | A | 5/2014 |
| JP | 2014095644 | A | 5/2014 |
| JP | 2015105898 | A | 6/2015 |
| JP | 2015124436 | A | 7/2015 |
| JP | 2016200518 | A * | 12/2016 |
| JP | 2016200518 | A | 12/2016 |
| KR | 19970005501 | B1 | 4/1997 |
| WO | 9714950 | A1 | 4/1997 |

OTHER PUBLICATIONS

Yamada et al., "Distribution of Burden Materials and Gas Permeability in a Large Volume Blast Furnace", Kawasaki Steel Giho, vol. 6, No. 1, p. 16-37 (1974)—Summary Only.

Yamada et al., "Distribution of Burden Materials and Gas Permeability in a Large Volume Blast Furnace" with translation, Kawasaki Steel Technical Report, 1974, vol. 6, No. 1, 46 pages.

Zou et al., "Prediction of the Porosity of Multi-Component Mixtures of Cohesive and Non-Cohesive Particles", Chemical Engineering Science, 2011, vol. 66, pp. 4711-4721.

Extended European Search Report for European Application No. 18776037.6, dated Aug. 7, 2020, 16 pages.

Japanese Office Action for Japanese Application No. 2018-534986, dated May 14, 2019 with Concise Statement of Relevance of Office Action, 6 pages.

Korean Office Action for Korean Application No. 10-2019-7028470, dated Mar. 2, 2021 with Concise Statement of Relevance of Office Action, 7 pages.

Korean Office Action for Korean Application No. 10-2019-7028470, dated Aug. 21, 2020 with Concise Statement of Relevance of Office Action, 4 pages.

Zhao, "A Method for Determining Grain Size from Digital Images of Sediment Based on Spatial Autocorrelation", Institute of Image & Graphic School of Computer Science with translation, 2005, 10 pages.

"Investigation on the Pneumatics and Mineralization Behaviour of Composite Agglomeration Process (CAP) of Iron Ores", China Master's Theses Full Text Database with translation, 2012, 11 pages.

Chinese Office Action for Chinese Application No. 201880023175.0, dated Jun. 30, 2021 with Concise Statement of Relevance of Office Action, 10 pages.

Korean Office Action for Korean Application No. 10-2019-7028470, dated Nov. 1, 2021, with Concise Statement of Relevance of Office Action, 8 pages.

Chinese Office Action for Chinese Application No. 201880023175.0, dated Nov. 23, 2021, with Concise Statement of Relevance of Office Action, 9 pages.

* cited by examiner

RAW MATERIAL PARTICLE SIZE DISTRIBUTION MEASURING APPARATUS, PARTICLE SIZE DISTRIBUTION MEASURING METHOD, AND POROSITY MEASURING APPARATUS

CROSS REFERENCE TO RELATED APPLICATIONS

This is the U.S. National Phase application of PCT/JP2018/013742, filed Mar. 30, 2018, which claims priority to Japanese Patent Application No. 2017-067152, filed Mar. 30, 2017, the disclosures of these applications being incorporated herein by reference in their entireties for all purposes.

FIELD OF THE INVENTION

The present invention relates to a raw material particle size distribution measuring apparatus, to a particle size distribution measuring method, and to a porosity measuring apparatus for measuring the particle size distribution of a raw material used for a blast furnace etc.

BACKGROUND OF THE INVENTION

In a production process in, for example, a blast furnace using raw materials such as minerals, ventilation in the furnace is one important indicator in the production process, and one of the factors determining the ventilation in the furnace is the particle size distributions of raw materials. Conventionally, regular sampling of a raw material and sieve analysis are used to know the particle size distribution of the raw material. However, since the sieve analysis is time consuming, it is difficult to reflect the results in real time in the operation of the blast furnace. There is therefore a need for a technique capable of obtaining the particle size distribution of a raw material conveyed to the blast furnace in real time.

CITATION LIST

Patent Literature

PTL 1: Japanese Unexamined, Patent Application Publication No. 2014-92494
PTL 2: Japanese Unexamined Patent Application Publication No. 2015-124436

Non Patent Literature

NPL 1: Takao Yamada and four others, "Distribution of Burden Materials and Gas Permeability in a Large Volume Blast Furnace," KAWASAKI STEEL GIHO Vol. 6 (1974) No. 1, p. 16-37

SUMMARY OF THE INVENTION

With a measurement method disclosed in Patent Literature 1, the particle size distribution of a granular raw material can be measured in real time. However, since a single camera or a single laser rangefinder is used, the accuracy of the measurement of the particle size distribution of the raw material is not sufficient on the small particle side because of limitations of the resolution of such a sensor. Since a small amount of fine powder can influence the ventilation in the blast furnace, there is a need for highly accurate measurement.

Patent Literature 2 discloses an apparatus for detecting materials to be charged. In this detection apparatus, the water content of a material to be charged is detected to measure the fine ratio in the material to be charged. However, only the fine ratio of a material to be charged that has a small particle size and adheres through water is highly correlated with the water content, and the particle size of a material to be charged having a large particle size cannot be measured with high accuracy.

Aspects of the present invention have been made in view of the foregoing problems in the conventional technology, and it is an object to provide a raw material particle size distribution measuring apparatus and a particle size distribution measuring method that can measure the particle size distribution of a raw material containing coarse particles and fine particles with high accuracy and to provide a porosity measuring apparatus that measures the porosity of the raw material using the measured particle size distribution.

The features of aspects of the present invention that solve the foregoing problems are as follows.

(1) An apparatus for measuring a particle size distribution of a raw material includes: a coarse particle measuring device that acquires information indicating a particle size distribution of coarse particles; a fine particle measuring device that acquires information indicating a particle size distribution of fine particles; and an arithmetic device that computes the particle size distribution of the coarse particles using the information indicating the particle size distribution of the coarse particles, computes the particle size distribution of the fine particles using the information indicating the particle size distribution of the fine particles, and computes an overall particle size distribution of the raw material using the particle size distribution of the coarse particles and the particle size distribution of the fine particles.

(2) In the apparatus for measuring a particle size distribution of a raw material according to (1), the information indicating the particle size distribution of the fine particles is image data about the raw material, and the particle size distribution of the fine particles is computed using average brightness obtained by averaging the brightness in the image data.

(3) In the apparatus for measuring a particle size distribution of a raw material according to (1), the fine particle measuring device includes a spectrometric measurement unit that performs spectral analysis on light reflected from the raw material to measure spectral reflectance thereof. The fine particle measuring device acquires spectral reflectances at a plurality of wavelengths as the information indicating the particle size distribution of the fine particles, and the arithmetic device computes the particle size distribution of the fine particles using scores of predetermined basis vectors obtained by subjecting the spectral reflectances at the plurality of wavelengths to principal component analysis or a partial least squares (PLS) method.

(4) A method for measuring a particle size distribution of a raw material includes: a coarse particle measuring step of acquiring information indicating a particle size distribution of coarse particles; a fine particle measuring step of acquiring information indicating a particle size distribution of fine particles; a coarse particle size distribution computing step of computing the particle size distribution of the coarse particles using the information indicating the particle size distribution of the coarse particles and acquired in the coarse particle measuring step; a fine particle size distribution computing step of computing the particle size distribution of the fine particles using the information indicating the particle size distribution of the fine particles and acquired in the fine particle measuring step; and a raw material particle size distribution computing step of computing an overall particle size distribution of the raw material using the particle size distribution of the coarse particles and the particle size distribution of the fine particles.

(5) In the raw material particle size distribution computing step in the method for measuring a particle size distribution of a raw material according to (4), the particle size distribution of the coarse particles and the particle size distribution of the fine particles are modeled by respective linear models, and a combination of the linear model of the particle size distribution of the coarse particles and the linear model of the particle size distribution of the fine particles is used to compute the overall particle size distribution of the raw material.

(6) A porosity measuring apparatus for measuring the porosity of a raw material stacked in a container and including coarse particles with large particle sizes and fine particles with small particle sizes includes: a coarse particle measuring device that measures a particle size distribution of the coarse particles; a fine particle measuring device that measures a particle size distribution of the fine particles; and an arithmetic device that computes the porosity of the raw material stacked in the container using the particle size distribution of the coarse particles that has been measured by the coarse particle measuring device and the particle size distribution of the fine particles that has been measured by the fine particle measuring device.

(7) In the porosity measuring apparatus according to (6), the coarse particle measuring device and the fine particle measuring device are disposed above a conveyer that conveys the raw material to the container, and the arithmetic device computes the porosity of the raw material stacked in the container.

(8) In the porosity measuring apparatus according to (6) or (7), the arithmetic device corrects the computed particle size distribution of the coarse particles and the computed particle size distribution of the fine particles such that the computed particle size distribution of the coarse particles and the computed particle size distribution of the fine particles respectively agree with a particle size distribution of the coarse particles that has been measured in advance using a sieve and a particle size distribution of the fine particles that has been measured in advance using a sieve.

(9) In the porosity measuring apparatus according to (8), the arithmetic device corrects the particle size distribution of the coarse particles that has been measured by the coarse particle measuring device using a calibration curve for correcting the particle size distribution of the coarse particles and corrects the particle size distribution of the fine particles that has been measured by the fine particle measuring device using a calibration curve for correcting the particle size distribution of the fine particles.

With the raw material particle size distribution measuring apparatus according to aspects of the present invention, the particle size distribution of a raw material containing coarse particles and fine powder can be measured with high accuracy. Moreover, in the raw material particle size distribution measuring apparatus, by subjecting the particle size distribution of the coarse particles and the particle size distribution of the fine particles to porosity conversion based on a porosity conversion model, the porosity of the raw material charged into and stacked in a container such as a blast furnace can be measured. By measuring the particle size distribution and porosity of coke to be charged into a blast furnace in real time using the raw material particle size distribution measuring apparatus to obtain the condition of the raw material in the blast furnace, the blast furnace can be operated according to the condition of the raw material in the blast furnace, and this contributes to the stabilization of the operation of the blast furnace.

DETAILED DESCRIPTION OF EMBODIMENTS OF THE INVENTION

Figure 1:
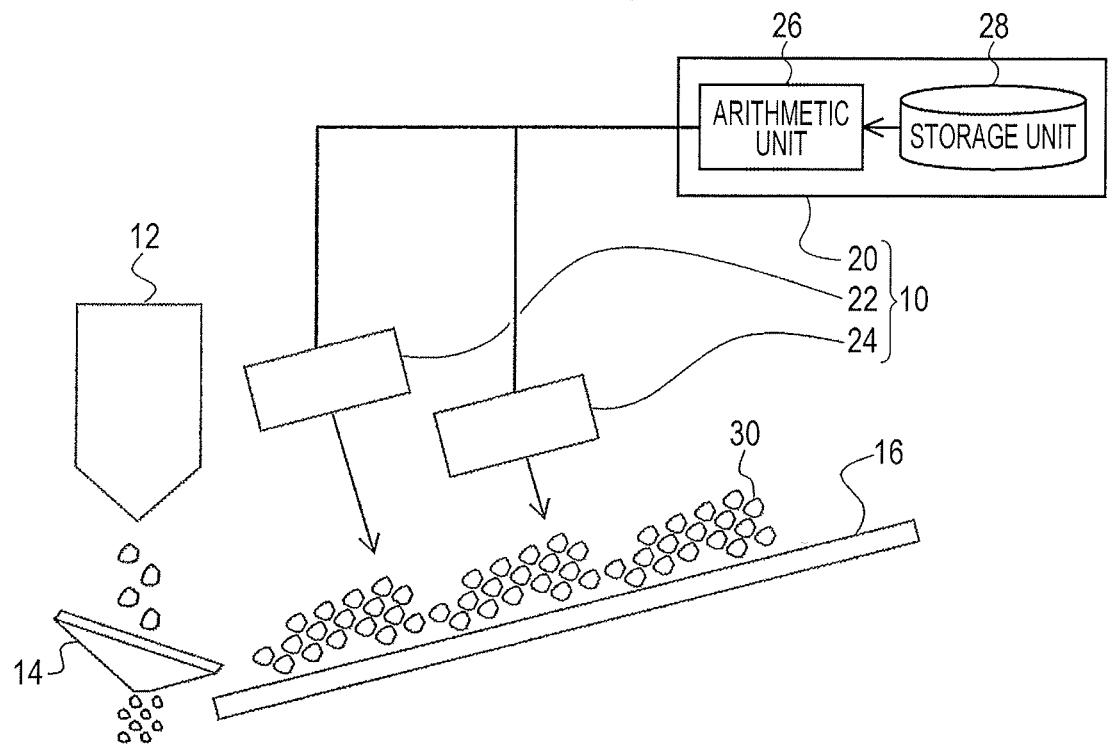
FIG. 1 is a schematic illustration showing an example of a raw material particle size distribution measuring apparatus according to an embodiment and its peripheral structure.

An embodiment of the present invention will be described using, as an example, measurement of the particle size distribution of coke, which is one of blast furnace raw materials conveyed by a conveyer in a production process using a blast furnace. FIG. 1 is a schematic illustration showing an example of a raw material particle size distribution measuring apparatus according to the embodiment and its peripheral structure. First, coke 30, which is a raw material to be charged into the blast furnace, is stored in a hopper 12. The coke 30 discharged from the hopper 12 is sieved with a sieve 14 to screen out small particles with particle sizes smaller the sieve mesh size of the sieve 14, and the resulting coke 30 is conveyed to the blast furnace (not shown) by a conveyer 16. However, since the sieving time using the sieve 14 is limited, the coke 30 contains fine particles that have not passed through the sieve 14, are equal to or smaller than the sieve mesh size of the sieve 14, and adhere to coke particles larger than the sieve mesh size. Therefore, the coke 30 conveyed by the conveyer 16 contains coarse particles larger than the sieve mesh size of the sieve 14 and fine particles that have not passed through the sieve 14 and are equal to or smaller than the sieve mesh size. In the present embodiment, the sieve mesh size of the sieve 14 is, for example, 35 mm. The blast furnace is an example of a container.

The raw material particle size distribution measuring apparatus 10 includes an arithmetic device 20, a coarse particle measuring device 22, and a fine particle measuring device 24. The coarse particle measuring device 22 is disposed above the conveyor 16. The coarse particle measuring device 22 performs a coarse particle measuring step to obtain information indicating the particle size distribution of the coarse particles in the coke 30 conveyed by the conveyor 16 in real time. The fine particle measuring device 24 is also disposed above the conveyor 16. The fine particle measuring device 24 performs a fine particle measuring step to obtain information indicating the particle size distribution of the fine particles in the coke 30 conveyed by the conveyor 16 in real time. In the present embodiment, the coarse particles in the coke 30 are lump coke with particle sizes larger than the sieve mesh size of the sieve 14, and the fine particles in the coke 30 are coke fines with particle sizes equal to or smaller than the sieve mesh size of the sieve 14.

The arithmetic device 20 is, for example, a general-purpose computer such as a workstation or a personal computer that includes an arithmetic unit 26 and a storage unit 28. The arithmetic unit 26 is, for example, a CPU and controls the operation of the coarse particle measuring device 22 and the operation of the fine particle measuring device 24 using programs and data stored in the storage unit 28. The arithmetic unit 26 obtains information indicating the particle size distribution of the coarse particles and information indicating the particle size distribution of the fine particles and computes the particle size distribution of the coke 30 containing the coarse particles and the fine particles. Programs for controlling the coarse particle measuring device 22 and the fine particle measuring device 24, programs for performing computations in the arithmetic unit 26, and arithmetic formulas etc. used during execution of these programs are prestored in the storage unit 28.

In the present embodiment, the coarse particle measuring device 22 is, for example, a laser rangefinder. The laser rangefinder is controlled by the arithmetic unit 26 and measures the distance from the laser rangefinder to the coke 30 on the conveyor 16 in real time. The laser rangefinder acquires profile data about the coke 30 that is information about the particle size distribution of the coarse particles and indicates the distance from the laser rangefinder to the coke 30. The laser rangefinder outputs the profile data about the coke 30 to the arithmetic device 20. Preferably, the laser rangefinder has a measurement region having the same width as the conveyor 16 and can measure all the coke 30 conveyed by the conveyor 16. The laser rangefinder scans the coke 30 conveyed by the conveyor 16 linearly with a laser beam, for example, in a direction orthogonal to the conveying direction at a rate of 1,000 to 10,000 lines/sec to generate two-dimensional profile data about the coke 30 that includes measured line data sets arranged in a time direction.

When the arithmetic unit 26 acquires the two-dimensional profile data about the coke 30 from the laser rangefinder, the arithmetic unit 26 performs particle segmentation processing on the profile data about the coke 30. The particle segmentation processing is used to identify individual particles in the two-dimensional profile data and performed using, for example, a processing method known as the Watershed algorithm. The arithmetic unit 26 computes the sizes of the particles of the coke 30 separated by the particle segmentation processing using a circular curve fitting method and then counts the numbers of particles in different predetermined particle size ranges to produce a histogram representing the particle size distribution of the coarse particles in the coke 30. The arithmetic unit 26 performs the above-described step for computing the particle size distribution of the coarse particles to compute the particle size distribution of the coarse particles in the coke 30 in real time.

The layer thickness of the coke 30 on the conveyor 16 is about 100 mm. Generally, when a granular material is stacked, large size particles segregate on an upper layer side, and small size particles segregate on a lower layer side. Similarly, in the coke layer, the coke 30 segregates. Specifically, the number of large size coke particles is larger on the upper layer side of the coke layer, and the number of small size coke particles is larger on the lower layer side. The particle size distribution computed using the profile data about the coke 30 is the particle size distribution of coke 30 present in the upper layer of the coke layer, and many large size coke particles are present in the particle size distribution. It is therefore known that the particle size distribution computed using the profile data about the coke 30 shows larger particle size distribution than the actual particle size distribution.

This phenomenon may be corrected as follows. Assume that the segregation in the coke layer does not change with time. Then the difference between the particle size distribution of the coke 30 on the upper layer side and the particle size distribution over the entire layer is measured in advance by sieve analysis and prestored in the storage unit 28. The arithmetic unit 26 may correct the computed particle size distribution of the coarse particles using the difference in the particle size distribution stored in the storage unit 28. This improves the accuracy in the measurement of the particle size distribution of the coarse particles.

The fine particle measuring device 24 is, for example, a camera equipped with a stroboscope. The camera is controlled by the arithmetic unit 26 and captures an image of the coke 30 at predetermined time intervals to acquire, in real time, image data about the coke 30 as information indicating the particle size distribution of the fine particles. The camera outputs the image data to the arithmetic unit 26. An image sensor such as a CCD or CMOS sensor included in the camera is an image acquisition unit that captures an image of the coke 30 to generate the image data.

When the arithmetic unit 26 acquires the image data from the camera, the arithmetic unit 26 computes the arithmetic mean of the brightnesses (0 to 255) of pixels in each set of image data to obtain the average brightness. A relational expression that associates the average brightness to the fine ratio of coke with a particle size of 1 mm or less (which may be hereinafter referred to as coke fines) is prestored in the storage unit 28, and the arithmetic unit 26 computes the fine ratio of the coke fines as the particle size distribution of the fine particles in the coke 30 using the average brightness and the relational expression. The arithmetic unit 26 performs the step of computing the particle size distribution of the fine particles to compute the particle size distribution of the fine particles in the coke 30 in real time. The fine ratio of the coke fines means the ratio of the mass of the coke fines to the total mass of the coke. Since most of the coke with a particle size equal to or less than the sieve mesh size of the sieve 14 is coke fines with a particle size of 1 mm or less as described later, the particle size distribution of the fine particles equal to or less than the sieve mesh size of the sieve 14 can be represented by the fine ratio of the coke fines with a particle size of 1 mm or less. Therefore, when the fine ratio of the coke fines can be measured, the particle size distribution of the fine particles with particle sizes equal to or less than the sieve mesh size of the sieve 14 can be measured.

Figure 2:
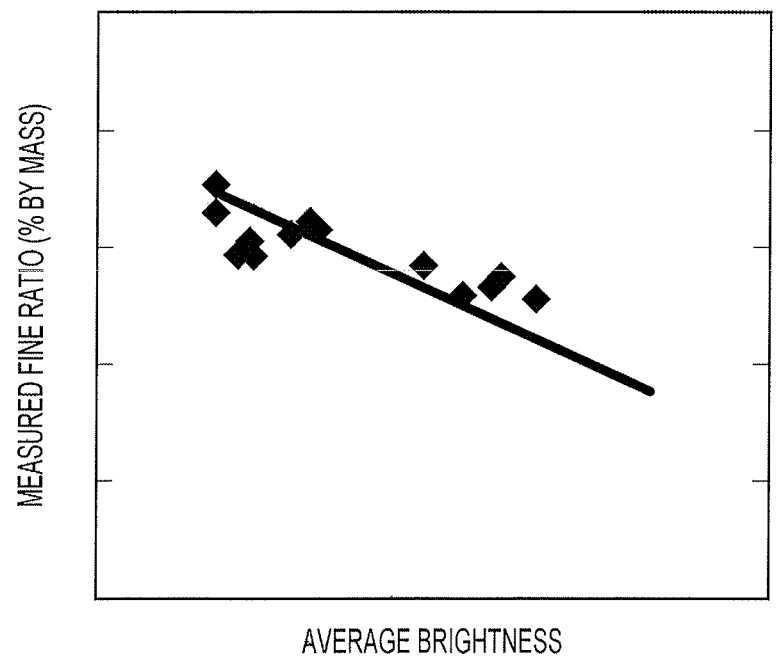
FIG. 2 is a graph showing the relation between the average brightness and the fine ratio of coke fines.

FIG. 2 is a graph showing the relation between the average brightness and the fine ratio of the coke fines. In FIG. 2, the vertical axis represents the measured fine ratio (% by mass) of the coke fines that is measured by sieve analysis performed after the coke is dried, and the horizontal axis is the arithmetic mean of the brightnesses of the pixels in the image data generated by capturing an image of the coke.

As shown in FIG. 2, there is a strong correlation between the fine ratio of the coke fines and the average brightness. Therefore, the relational expression between the average brightness and the fine ratio of the coke fines that is represented by a solid line in FIG. 2 is computed and prestored in the storage unit 28, and the arithmetic unit 26 can thereby compute the fine ratio of the coke fines using the average brightness and the relational expression. After the computation of the particle size distribution of the coarse particles and the particle size distribution of the fine particles using the average brightness and the relational expression, the arithmetic unit 26 computes the particle size distribution of the coke 30 using these distributions.

The fine particle measuring device 24 used may be a spectroscopic system including a spectrometric measurement unit that performs spectral analysis on light reflected from the coke 30 to measure its spectral reflectance. In this case, the spectroscopic system acquires in real time the spectral reflectance at the absorption wavelength of water and the spectral reflectances at two reference wavelengths different from the absorption wavelength of water and lying on both sides of the absorption wavelength of water as the information indicating the particle size distribution of the fine particles. The spectroscopic system acquires the spectral reflectances at, for example, a rate of one measurement/sec. or higher and outputs the spectral reflectances at the three wavelengths to the arithmetic unit 26.

The arithmetic unit 26 computes the absorbance at the absorption wavelength of water using the acquired spectral reflectances at the three wavelengths and the following formula (1).

$$X = 1 - [\lambda 2 / \{\alpha \cdot \lambda 1 + (1-\alpha) \cdot \lambda 3\}] \quad (1)$$

In formula (1), X is the absorbance at the absorption wavelength of water. $\lambda 1$ and $\lambda 3$ are the spectral reflectances at the reference wavelengths, and $\lambda 2$ is the spectral reflectance at the absorption wavelength of water. $\alpha$ is a weight and is 0.5 for 3-color ratio calculation. During calibration, $\lambda 1 = \lambda 2 = \lambda 3 = 1$, and $X = 0$.

As shown by formula (1) above, the arithmetic unit 26 computes the absorbance at the absorption wavelength of water by computing the ratio of the spectral reflectance at the absorption wavelength of water to the spectral reflectances at the two reference wavelengths different from the absorption wavelength of water and then subtracting the above obtained ratio from 1.

The relational expression that associates the absorbance at the absorption wavelength of water with the fine ratio of the coke fines is prestored in the storage unit 28, and the arithmetic unit 26 computes the fine ratio of the coke fines by simple linear regression using the computed absorbance at the absorption wavelength of water and the relational expression. As described above, even when the spectroscopic system is used as the fine particle measuring device 24, the arithmetic unit 26 can compute the particle size distribution of the fine particles in the coke 30 in real time.

Figure 3:
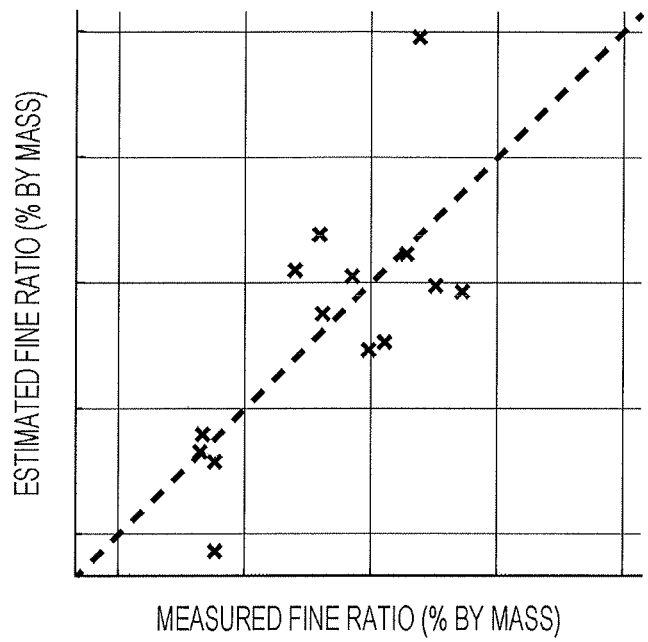
FIG. 3 is a graph showing the relation between an estimated fine ratio of coke fines computed from absorbance and their fine ratio actually measured.

FIG. 3 is a graph showing the relation between an estimated fine ratio of the coke fines computed using the absorbance and the fine ratio actually measured. In FIG. 3, the vertical axis represents the estimated fine ratio (% by mass) of the coke fines, and the horizontal axis represents the measured fine ratio (% by mass) of the coke fines measured by sieve analysis on the dried coke. As shown in FIG. 3, the correlation between the estimated fine ratio of the coke fines computed from the absorbance and the measured fine ratio of the coke fines obtained by sieve analysis is high, i.e., the correlation coefficient is 0.73. Therefore, it is found that the fine ratio of the coke fines can be computed using the absorbance with high accuracy.

When the spectroscopic system is used as the fine particle measuring device 24, the spectroscopic system may acquire, as the information indicating the particle size distribution of the fine particles, spectral reflectances at nine wavelengths in the visible and infrared ranges in real time. In this case, the spectroscopic system acquires the spectral reflectances at wavelengths of, for example, blue, green, red, 1.32 µm, 1.46 µm, 1.60 µm, 1.80 µm, 1.96 µm, and 2.10 µm that are arranged from the short wavelength side. The spectroscopic system outputs the spectral reflectances at the nine wavelengths to the arithmetic unit 26. The blue is a wavelength in the range of 435 to 480 nm, and the green is a wavelength in the range of 500 to 560 nm. The red is a wavelength in the range of 610 to 750 nm.

Upon acquisition of the spectral reflectances at the nine wavelengths, the arithmetic unit 26 computes the scores of predetermined basis vectors using arithmetic formulas prestored in the storage unit 28. The arithmetic unit 26 computes the fine ratio of the coke fines using a relational expression that associate the scores with the fine ratio of the coke fines. The scores of the predetermined basis vectors are the scores of basis vectors strongly correlated with a change in the fine ratio of the coke 30 and selected from nine basis vectors obtained by principal component analysis on the spectral reflectances obtained from the spectroscopic system.

The arithmetic formulas for computing the scores from the spectral reflectances at the nine wavelengths and the relational expression that associates the scores with the fine ratio of the coke fines are prestored in the storage unit 28. The arithmetic formulas for computing the scores and the relational expression between the scores and the fine ratio of the coke fines are determined as follows.

First, the spectroscopic system is used to measure the spectral reflectances of the coke conveyed by the conveyer 16 at the nine wavelengths. The measured spectral reflectances at the nine wavelengths are subjected to principal component analysis to obtain nine basis vectors of first to ninth principal components and nine scores computed from the basis vectors. Next, the coke used to measure the spectral reflectances is collected and subjected to sieve analysis to actually measure the fine ratio of the coke fines with particle sizes of 1 mm or less. The fine ratio is computed as follows. The coke is dried and then sieved using a sieve with a mesh size of 1 mm. The fine ratio is computed as the ratio of the difference in the mass of the coke before and after sieving to the mass of the coke before sieving.

This procedure is repeated using different types of coke with different fine ratios and different water contents to obtain a plurality of sets of data. Each set of data includes nine scores and the fine ratio obtained by the sieve analysis. The nine scores of each type of coke are compared with those of other types of coke with different fine ratios in the plurality of sets of data, and n scores (n is a natural number smaller than 9) that are strongly correlated with a change in the fine ratio of the coke are identified. The scores can be computed using the basis vectors for the scores.

The relational expression that associates the scores with the fine ratio of the coke fines is, for example, formula (2) that is a regression formula with the fine ratio of the coke fines (Y) as a response variable and the identified n scores $(X_1, X_2, \ldots, X_n)$ as explanatory variables.

$$Y = e + f_1 \times X_1 + f_2 \times X_2 + \ldots + f_n \times X_n \quad \text{formula (2)}$$

In formula (2), e, $f_1, f_2, \ldots, f_n$ are parameters of the regression formula.

By identifying the n scores strongly correlated with the change in the fine ratio of the coke fines, data sets each including the fine ratio and the identified n scores can be obtained from the data sets for different types of coke with different fine ratios and different water contents, each data set including the nine scores and the fine ratio of the coke. Therefore, the parameters in formula (2) can be computed using the data and the least squares method. Formula (2) is the relational expression that associates the identified scores with the fine ratio of the coke fines.

In the example shown above, the spectral reflectances at the nine wavelengths are subjected to the principal component analysis to identify the scores strongly correlated with the fine ratio of the coke 30, but this is not a limitation. The scores strongly correlated with the fine ratio of the coke may be determined directly by acquiring a plurality of sets of data each including the fine ratio and the spectral reflectances at the nine wavelengths and applying the partial least squares (PLS) method to these data sets. In this case, arithmetic formulas for computing the scores strongly correlated with the fine ratio of the coke can be computed from the basis vectors for the scores determined by the PLS. The relational expression between the fine ratio and the scores is the same regression formula as formula (2). The parameters of the regression formula in formula (2) can be determined by the least squares method from a plurality of sets of data each including the fine ratio and the scores determined by the PLS method.

Figure 4:
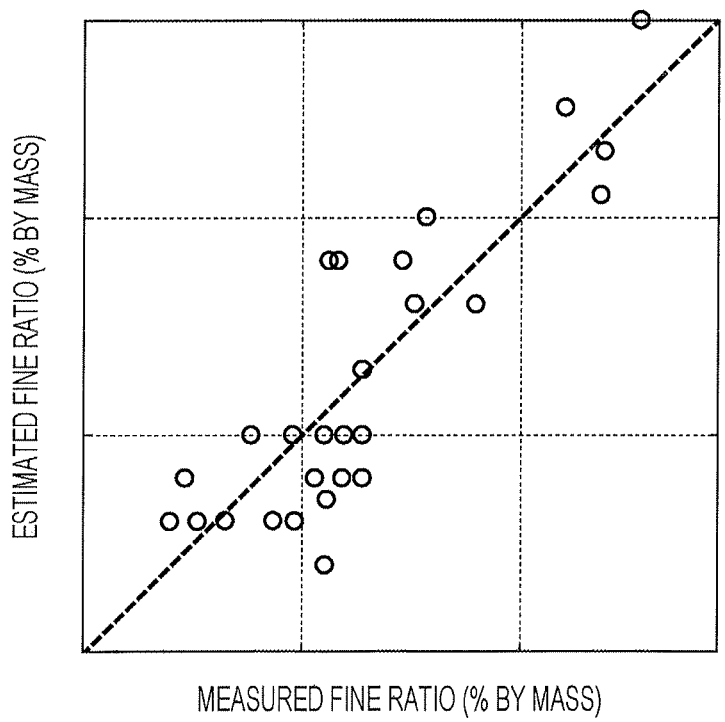
FIG. 4 is a graph showing the relation between an estimated fine ratio of coke fines computed from scores obtained using PLS and their fine ratio actually measured.

FIG. 4 is a graph showing the relation between the estimated fine ratio of the coke fines computed from the scores obtained by using the PLS and the measured fine ratio. In FIG. 4, the horizontal axis represents the measured fine ratio (% by mass), and the vertical axis represents the estimated fine ratio (% by mass). The measured fine ratio is computed as follows. As in the above-described method, the coke is dried, and then the dried coke is sieved with a sieve with a mesh size of 1 mm. The fine ratio is computed as the ratio of the difference in the mass of the coke before and after sieving to the mass of the coke before sieving. The estimated fine ratio is the fine ratio of the coke computed using a regression formula that uses the fine ratio of the coke as a response variable and two scores strongly correlated with the fine ratio of the coke obtained by the PLS as explanatory variables. As shown in FIG. 4, there is a strong correlation between the estimated fine ratio of the coke and the measured fine ratio, and the correlation coefficient is 0.78. As can be seen from these results, the fine ratio of the coke can be determined with sufficient accuracy by using the scores obtained using the PLS.

A laser scattering-type particle size distribution measuring device that irradiates the coke 30 with a laser beam to measure the particle size distribution of the coke fines from an optical intensity pattern formed by the scattered light may be used as a fine particle measuring unit. In this case, the laser scattering-type particle size distribution measuring device acquires the particle size distribution of the coke fines in real time (at intervals of 30 seconds). The laser scattering-type particle size distribution measuring device outputs the particle size distribution of the coke fines to the arithmetic unit 26.

Figure 5:
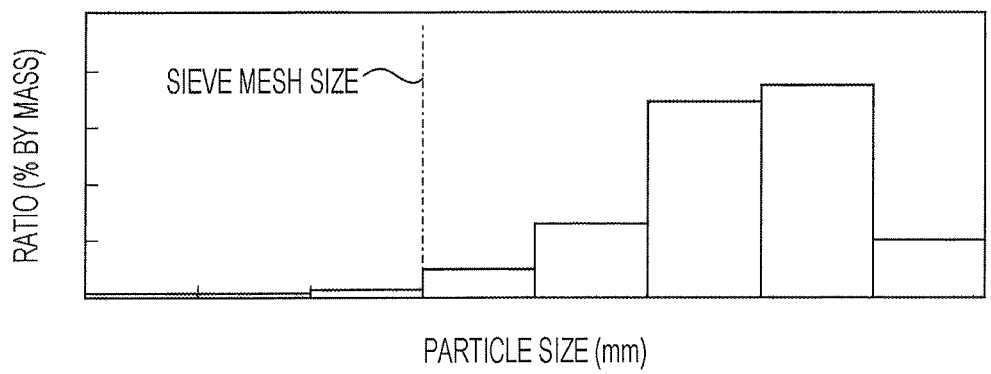
FIG. 5 is a graph showing the particle size distribution of coke obtained by sieve analysis.

FIG. 5 is a graph showing the particle size distribution of the coke 30 conveyed by the conveyer 16. The particle size distribution is determined by sieve analysis. A dash-dot line in FIG. 5 represents the sieve mesh size of the sieve 14. Since the fine particles equal to or less than the sieve mesh size of the sieve 14 are removed from the coke 30 by sieving with the sieve 14, the ratio of fine particles in a region on the left side of the dash-dot line and less than the sieve mesh size is small.

Figure 6:
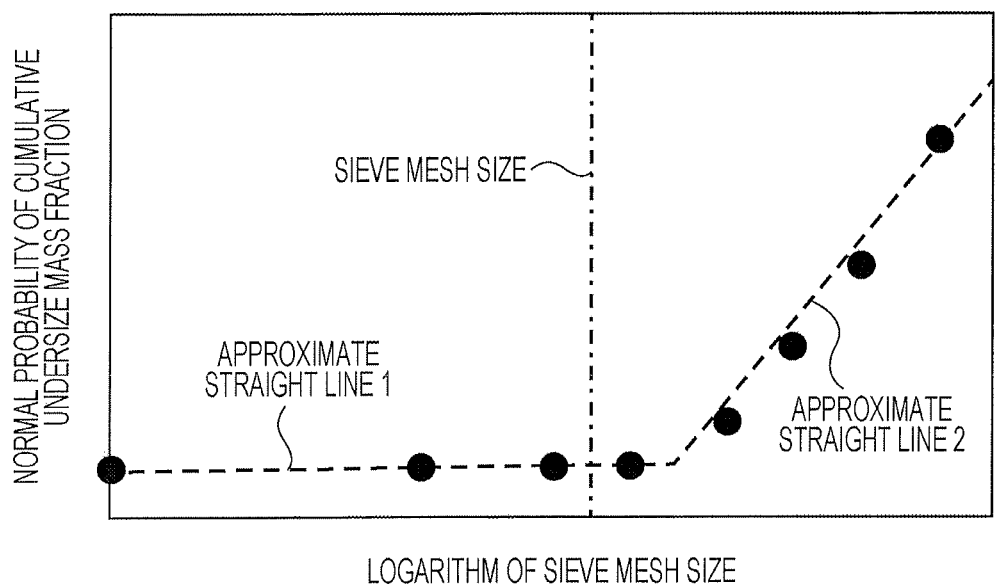
FIG. 6 is a graph showing the relation between the logarithm of the mesh size of a sieve used for the sieve analysis on coke conveyed by a conveyer and the normal probability of a cumulative undersize mass fraction.

FIG. 6 is a graph showing the relation between the logarithm of the mesh size of the sieve used for the sieve analysis on the coke 30 conveyed by the conveyer 16 and the normal probability of the cumulative undersize mass fraction. In FIG. 6, the horizontal axis represents the logarithm of the mesh size of the sieve used for the sieve analysis on the coke 30, and the cumulative undersize mass fraction of the coke is plotted on the vertical axis with a normal probability scale versus the sieve mesh size. In the example shown in FIG. 6, an approximate straight line 1 is an approximate straight line for the fine particles in the coke 30, and an approximate straight line 2 is an approximate straight line for the coarse particles in the coke 30. A dash-dot line represents the sieve mesh size of the sieve 14.

As shown in FIG. 6, in the coke 30 sieved with the sieve 14, fine particles of coke 30 equal to or smaller than the sieve mesh size of the sieve 14 are present, although their amount is small. The fine particles of coke 30 in the region on the left side of the dash-dot line and less than the sieve mesh size are coke fines adhering to the coarse particles in the coke 30, and the particle size of the fine particles is much smaller than the sieve mesh size of the sieve 14. Therefore, in the region in which the particle size of the coke 30 is equal to or less than the sieve mesh size of the sieve 14, the cumulative undersize mass fraction does not increase as the particle size of the coke 30 increases.

However, the cumulative undersize mass fraction of the coarse particles larger than the sieve mesh size increases as the particle size of the coke 30 increases. The coarse particles in the coke 30 are considered to be pulverized-crushed particles. In this case, it is known that the cumulative oversize mass fraction distribution of the coarse particles in the coke 30 can be approximated by the Rosin-Rammler distribution. This means that, when particles are naturally crushed-pulverized, there is regularity in their particle size distribution. Therefore, the relation shown in FIG. 6 that does not follow the Rosin-Rammler distribution is a phenomenon different from natural crushing-pulverization.

As can be seen from FIG. 6, the relation between the particle size of the fine particles in the coke 30 and the cumulative undersize mass fraction significantly differs from the relation between the particle size of the coarse particles in the coke 30 and the cumulative undersize mass fraction, and two different linear distributions are present so as to border on each other at the sieve mesh size. In the particle size distribution measuring apparatus 10 according to the present embodiment, the coarse particle measuring device 22 and the fine particle measuring device 24 that differ from each other are used to acquire the information indicating the particle size distribution of the fine particles equal to or smaller than the sieve mesh size of the sieve 14 and the information indicating the particle size distribution of the coarse particles larger than the sieve mesh size of the sieve 14 independently, and the arithmetic unit 26 computes, using the above information, the particle size distribution of the coarse particles and the particle size distribution of the fine particles. The arithmetic unit 26 performs the step of computing the particle size distribution of the raw material to compute the overall particle size distribution of the coke 30. Specifically, the particle size distribution of the coarse particles and the particle size distribution of the fine particles are modeled by linear models using the cumulative undersize mass fraction, and a combination of the linear models is used to compute the overall particle size distribution of the coke 30.

Figure 7:
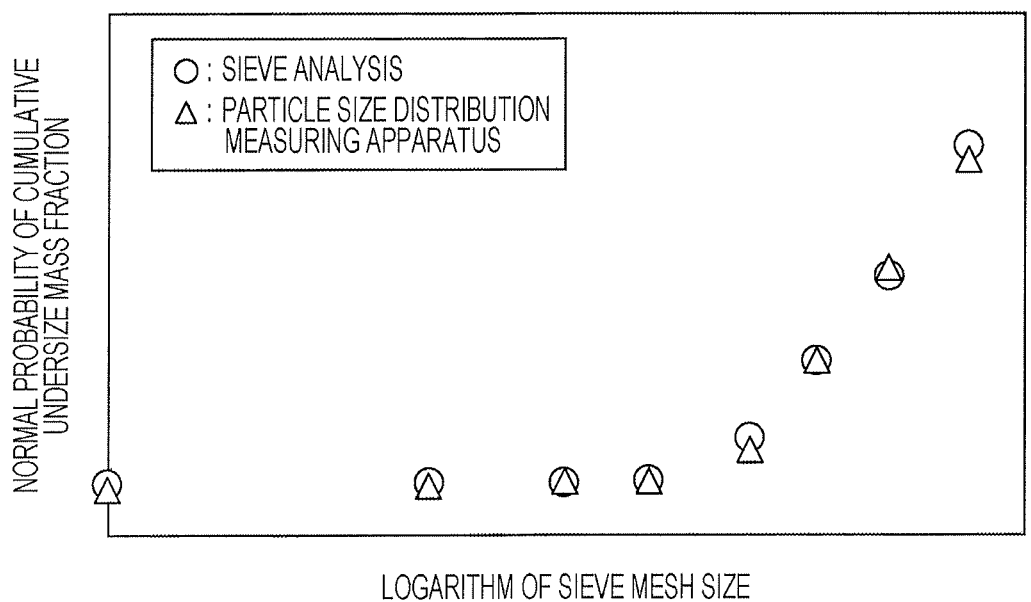
FIG. 7 is a graph comparing the results of measurement of the particle size distribution by sieve analysis and the results of measurement of the particle size distribution using. the raw material particle size distribution measuring apparatus.

FIG. 7 is a graph comparing the results of measurement of the particle size distribution by sieve analysis and the results of measurement of the particle size distribution by the raw material particle size distribution measuring apparatus. In FIG. 7, the horizontal axis represents the logarithm of the sieve mesh size for the coke, and the cumulative undersize mass fraction of the coke 30 is plotted on the vertical axis with a normal probability scale versus the sieve mesh size. The results of the measurement using the raw material measuring apparatus are shown in FIG. 7. The raw material measuring apparatus used for the measurement includes a laser rangefinder serving as a coarse particle measuring unit and a digital camera equipped with a strobe light serving as a fine particle measuring unit.

As shown in FIG. 7, open circles indicating the cumulative undersize mass fraction of the coke 30 measured by the sieve analysis agree with triangles indicating the cumulative undersize mass fraction of the coke 30 measured by the particle size distribution measuring apparatus 10. As can be seen from the above results, by using the particle size distribution measuring apparatus 10 to compute the particle size distribution of the coarse particles in the coke 30 and the particle size distribution of the fine particles independently and then combining these distributions together using the cumulative undersize mass fraction, the particle size distribution of the coke 30 can be measured with high accuracy.

The arithmetic unit 26 may correct the particle size distribution of the coarse particles in the coke 30 measured by the coarse particle measuring device 22 and the particle size distribution of the fine particles in the coke 30 measured by the fine particle measuring device 24 such that they agree with the known particle size distribution of the coke 30 measured in advance by sieve analysis. The arithmetic unit 26 may correct the particle size distribution of the coarse particles measured by the coarse particle measuring device 22 using a calibration curve for correcting the particle size distribution of the coarse particles and may correct the particle size distribution of the fine particles measured by the fine particle measuring device 24 using a calibration curve for correcting the particle size distribution of the fine particles. As described above, the relation between the particle size distribution of the fine particles in the coke 30 and their cumulative undersize mass fraction significantly differs from the relation between the particle size distribution of the coarse particles in the coke 30 and their cumulative undersize mass fraction. Therefore, the arithmetic unit 26 corrects these results using calibration curves modeled using different approximate straight lines, and this allows the particle size to be measured with higher accuracy.

The calibration curves are produced by the following procedure. First, the coarse particle measuring device 22 and the fine particle measuring device 24 are used to measure the particle size distribution of the coarse particles and the particle size distribution of the fine particles, and the cumulative undersize mass fraction is measured at at least two particle sizes. Values computed in this measurement are referred to as measurement values 1. Next, a sample is collected from the coke 30 used for the measurement and subjected to sieve analysis to measure its particle size distribution. Values measured by this measurement are referred to as measurement values 2. The above measurement procedure is repeated at least twice to obtain at least two sets of combination of the measurement values 1 and 2 and more preferably 10 or more sets.

Then, the logarithm of the sieve mesh size is plotted on the horizontal axis (x axis), and the cumulative undersize mass fraction is plotted on the vertical axis (y axis) with a normal probability scale versus the sieve mesh size, as in FIG. 6. The plotted measurement values 1 are subjected to linear regression, and formulas (3) and (4) below are obtained. In formulas (3) and (4), $y_s$ is the cumulative undersize mass fraction of the fine particles equal to or smaller than the sieve mesh size of the sieve 14, and $y_l$ is the cumulative undersize mass fraction of the coarse particles larger than the sieve mesh size of the sieve 14.

$$y_s = a_{s1}(x_s - C_{S1}) \quad \text{formula (3)}$$

$$y_l = a_{l1}(x_l - C_{l1}) \quad \text{formula (4)}$$

In formulas (3) and (4), $x_s$ is a particle size that satisfies $x_b \geq x_s$ where $x_b$ is the sieve mesh size of the sieve (its logarithm), and $x_l$ is a particle size that satisfies $x_b < x_l$. $a_{s1}$, $C_{S1}$, $a_{l1}$, and $C_{l1}$ are parameters to be determined. $a_{s1}$ and $C_{S1}$ are computed using formula (3) and at least two sets of data about the particle size distribution measured by the fine particle measuring device 24 and the cumulative undersize mass fraction. Similarly, $a_{l1}$ and $C_{l1}$ are computed using formula (4) and at least two sets of data about the particle size distribution measured by the coarse particle measuring device 22 and the cumulative undersize mass fraction.

Similarly, measurement values 2 are subjected to linear regression, and the following formulas (5) and (6) are obtained for the cumulative undersize mass fraction $y_s$ of the fine particles equal to or smaller than the sieve mesh size of the sieve 14 and the cumulative undersize mass fraction $y_l$ of the coarse particles larger than the sieve mesh size of the sieve 14.

$$y_s = a_{s2}(x_s - C_{S2}) \quad \text{formula (5)}$$

$$y_l = a_{l2}(x_l - C_{l2}) \quad \text{formula (6)}$$

In formulas (5) and (6), $x_s$ is a particle size that satisfies $x_b \geq x_s$ where $x_b$ is the sieve mesh size of the sieve 14, and $x_l$ is a particle size that satisfies $x_b < x_l$. $a_{s2}$, $C_{S2}$, $a_{l2}$ and $C_{l2}$ are parameters to be determined. $a_{s2}$ and $C_{S2}$ are computed using formula (5) and at least two sets of data about the particle size distribution measured by the sieve analysis and the cumulative undersize mass fraction. Similarly, $a_{l2}$ and $C_{l2}$ are computed using formula (6) and at least two sets of data about the particle size distribution measured by the sieve analysis and the cumulative undersize mass fraction.

Next, $a_{s1}$ and $a_{s2}$ computed using formulas (3) and (5) and $C_{S1}$ and $C_{S2}$ computed using formulas (3) and (5) are subjected to linear regression, and formulas (7) and (8) below are obtained. $a_{l1}$ and $a_{l2}$ computed using formulas (4) and (6) and $C_{l1}$ and $C_{l2}$ computed using formulas (4) and (6) are subjected to linear regression, and the following formulas (9) and (10) are obtained.

$$a_{s2} = D_{as}a_{s1} + E_{as} \quad \text{formula (7)}$$

$$C_{s2} = D_{bs}C_{s1} + E_{bs} \quad \text{formula (8)}$$

$$a_{l2} = D_{al}a_{l1} + E_{al} \quad \text{formula (9)}$$

$$C_{l2} = D_{bl}C_{l1} + E_{bl} \quad \text{formula (10)}$$

In formulas (7) to (10) above, $D_{as}$, $E_{as}$, $D_{bs}$, $E_{bs}$, $D_{al}$, $E_{al}$, $D_{bl}$, and $E_{bl}$ are parameters to be determined. The straight lines defined by $D_{as}$, $E_{as}$, $D_{bs}$, $E_{bs}$, $D_{al}$, $E_{al}$, $D_{bl}$, and $E_{bl}$ computed using formulas (7) to (10) are calibration curves modeled by linear approximation. A problem when the fine particle measuring device 24 is used to measure the fine ratio is that the values of $a_{s1}$, $C_{s1}$, $a_{s2}$, and $C_{s2}$ in formulas (3) and (5) cannot be determined using one data point. In this case, $a_{s1}$ and $a_{s2}$ may be deleted, and parameters $y=C_{s1}$ and $y=C_{s2}$ may be used. In this case, the parameters can be determined using only one data point. In particular, as shown in FIG. 6, since the cumulative undersize mass fraction value of the fine particles in the coke 30 sieved using the sieve 14 does not change with the particle size, the parameters $a_{s1}$ and $a_{s2}$ can be deleted without any problem.

Next, a method for correcting the particle size distribution using calibration curves will be described. The coarse particle measuring device 22 and the fine particle measuring device 24 are used to perform measurement on the coke 30 conveyed by the conveyer 16 to thereby obtain measurement values 3. The cumulative undersize mass fraction $y_s$ of the fine particles equal to or smaller than the sieve mesh size of the sieve 14 and the cumulative undersize mass fraction $y_l$ of the coarse particles larger than the sieve mesh size of the sieve 14 are subjected to linear regression using the same method as that used to determine formulas (3) to (6), and the following formulas (11) and (12) are obtained.

$$y_s = a_{s3}(x_s - C_{S3}) \quad \text{formula (11)}$$

$$y_l = a_{l3}(x_l - C_{l3}) \quad \text{formula (12)}$$

In formulas (11) and (12), $x_s$ is a particle size that satisfies $x_b \geq x_s$ where $x_b$ is the sieve mesh size of the sieve 14, and $x_l$ is a particle size that satisfies $x_b < x_l$. $a_{s3}$, $C_{s3}$, $a_{l3}$, and $C_{l3}$ are parameters to be determined. $a_{s3}$ and $C_{s3}$ are computed using formula (11) and at least two sets of data about the particle size distribution measured using the fine particle measuring device 24 and the cumulative undersize mass fraction. Similarly, $a_{l3}$ and $C_{l3}$ are computed using formula (12) and at least two sets of data about the particle size distribution measured using the coarse particle measuring device 22 and the cumulative undersize mass fraction. The computed parameters $D_{as}$, $E_{as}$, $D_{bs}$, $E_{bs}$, $D_{al}$, $E_{al}$, $D_{bl}$, and $E_{bl}$, $a_{s3}$, $C_{s3}$, $a_{l3}$, and $C_{l3}$ computed using formulas (11) and (12), and formulas (13) to (16) are used to compute $a_{s4}$, $C_{s4}$, $a_{l4}$, and $C_{l4}$.

$$a_{s4} = D_{as}a_{s3} + E_{as} \quad \text{formula (13)}$$

$$C_{s4} = D_{bs}C_{s3} + E_{bs} \quad \text{formula (14)}$$

$$a_{l4} = D_{al}a_{l3} + E_{al} \quad \text{formula (15)}$$

$$C_{l4} = D_{bl}C_{l3} + E_{bl} \quad \text{formula (16)}$$

Formula (17) that uses $a_{s4}$ and $C_{s4}$ computed from formulas (13) to (16) is a formula for correcting the relation between the particle size distribution measured using the fine particle measuring device 24 and the cumulative undersize mass fraction, and formula (18) that uses $a_{l4}$ and $C_{l4}$ is a formula for correcting the relation between the particle size distribution measured using the coarse particle measuring device 22 and the cumulative undersize mass fraction.

$$y_s = a_{s4}(x_s - C_{S4}) \quad \text{formula (17)}$$

$$y_l = a_{l4}(x_l - C_{l4}) \quad \text{formula (18)}$$

As described above, the arithmetic unit 26 corrects the particle size distribution of the coarse particles using the calibration curve for correcting the particle size distribution in the particle size measurement range of the coarse particle measuring device 22 and corrects the particle size distribution of the fine particles using the calibration curve for correcting the particle size distribution in the particle size measurement range of the fine particle measuring device 24. In this manner, the particle size distribution measuring apparatus 10 according to the present embodiment can measure the particle size distribution of the coke 30 with higher accuracy.

Figure 8:
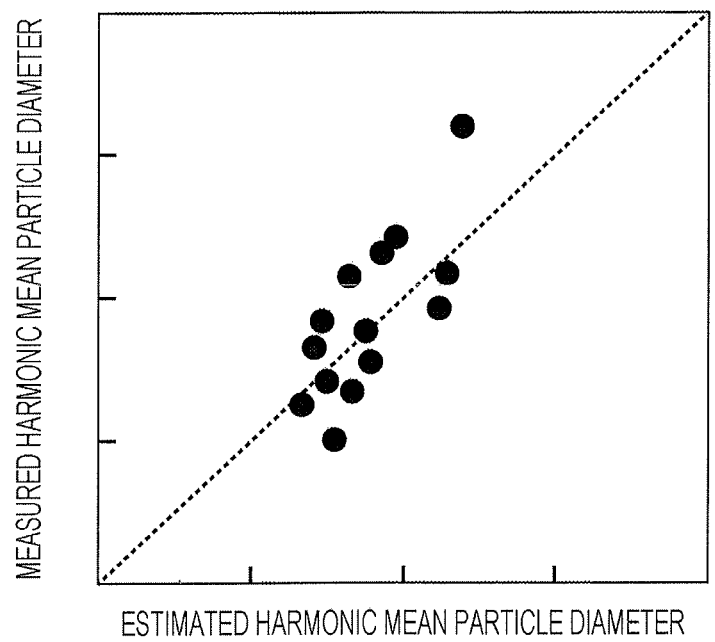
FIG. 8 is a graph showing the relation between a harmonic mean particle diameter actually measured by sieve analysis and an estimated harmonic mean particle diameter computed using the raw material measuring apparatus.

FIG. 8 is a graph showing the relation between the harmonic mean particle diameter measured by sieve analysis and the estimated harmonic mean particle diameter computed by the raw material measuring apparatus. In FIG. 8, the horizontal axis represents the estimated harmonic mean particle size of the coke 30 measured by the particle size distribution measuring apparatus 10, and the vertical axis represents the measured harmonic mean particle size of the coke 30 measured by the sieve analysis. The results of the measurement shown in FIG. 8 were obtained using the raw material measuring apparatus. The raw material measuring apparatus used includes a laser rangefinder used as the coarse particle measuring device and a digital camera equipped with a strobe light used as the fine particle measuring device. The measurement values were corrected using the calibration curves described above. As can be seen from FIG. 8, the harmonic mean particle diameter of the coke 30 measured by the sieve analysis agrees with the harmonic mean particle diameter of the coke 30 measured using the particle size distribution measuring apparatus 10 according to the present embodiment.

Next, a method for computing the porosity of the coke 30 stacked in a blast furnace will be described. The porosity can be computed using the particle size distribution measuring apparatus 10 according to the present embodiment. In the present embodiment, the porosity is measured using, for example, a Sato-Taguchi model (Non Patent Literature 1) in which coarse particles and fine particles are treated separately to compute the porosity. However, this model is not a limitation, and any other model for computing the porosity may be used. With the above model, the porosity s can be computed using the following formula (19).

[Math. 1]

$$\varepsilon = (a \times \log D_p + b) \times (1 - c \times I_{sp}^d) \quad \text{formula (19)}$$

In formula (19), a, b, c, and d are parameters that are quantities experimentally determined according to the type of particles. For example, in the case of coke, a=0.153, b=0.418, c=0.01225, and d=0.416. $D_p$ is the harmonic mean particle size, and $I_{sp}$ is a value defined by the following formulas (20), (21), and (22).

[Math. 2]

$$I_{sp} = 100 \times \sqrt{I_p \times I_s} \quad \text{formula (20)}$$

[Math. 3]

$$I_p = \frac{1}{D_p^2} \times \sum_i w_i (D_i - D_p)^2 \quad \text{formula (21)}$$

-continued

[Math. 4]

$$I_s = D_p^2 \times \sum_i w_i \left(\frac{1}{D_i} - \frac{1}{D_p}\right)^2 \quad \text{formula (22)}$$

In formulas (21) and (22), $D_i$ is the center diameter of the i-th particle size, and $W_i$ is the undersize mass fraction at the i-th particle size. $I_p$ defined by formula (21) is a quantity that represents the variance of the particle size distribution and is largely influenced more by the coarse particles than by the fine particles. $I_s$ defined by formula (22) is a quantity that represents the variance of the specific surface area and is largely influenced by the fine particles. As described above, the above model is highly compatible with the particle size distribution measuring apparatus 10 that can measure the particle size distribution of the coarse particles and the particle size distribution of the fine particles separately.

The particle size distribution measuring apparatus 10 according to the present embodiment in which formulas (19) to (22) are prestored in the storage unit 28 is used as a porosity measuring apparatus. The porosity measuring apparatus measures the particle size distribution of the coarse particles and the particle size distribution of the fine particles in the coke 30 conveyed by the conveyer 16 in real time using separate measurement devices, i.e., the coarse particle measuring device 22 and the fine particle measuring device 24. The porosity measuring apparatus can measure the porosity of the coke stacked in the blast furnace in real time using the particle size distribution of the coarse particles and the particle size distribution of the fine particles. Therefore, in a production process in, for example, the blast furnace, the blast furnace can be operated while the condition of the coke 30 charged into the blast furnace is obtained in real time, and this can contribute to the stabilization of the operation of the blast furnace.

By correcting the measurement values using the respective calibration curves for different measurement ranges, the particle size distribution of the coarse particles and the particle size distribution of the fine particles can be measured with high accuracy, and the accuracy of the measurement of the porosity of the coke 30 is also improved.

In the example described in the present embodiment, the coke 30 conveyed by the conveyer 16 is used as the raw material, but this is not a limitation. Other examples of the raw material charged into the blast furnace are lump ore and sintered ore, and they may be used instead of the coke. The present embodiment can be more preferably used when the step of removing fine particles using a sieve is provided before the raw material is charged into the blast furnace.

In the example described in the present embodiment, the laser rangefinder is used as the coarse particle measuring device 22, but this is not a limitation. Any device such as a combination of a camera and a light may be used as the coarse particle measuring device 22, so long as it can observe the upper surface of the coke 30 on the conveyer 16 and can measure the particle size distribution of the coarse particles. Part of the function of the arithmetic device 20 described in the present embodiment may be performed by the coarse particle measuring device 22 and the fine particle measuring device 24. The coarse particle measuring device 22 may compute the particle size distribution of the coarse particles, and the fine particle measuring device 24 may compute the particle size distribution of the fine particles.

In the example described in the present embodiment, the particle size distribution of the coarse particles is the particle size distribution of coke 30 having a particle size larger than the sieve mesh size of the sieve 14, and the particle size distribution of the fine particles is the particle size distribution of coke 30 having a particle size equal to or smaller than the sieve mesh size of the sieve 14. However, the particle size distributions of the coarse particles and the fine particles may be determined in at least one of the range in which the accuracy of the measurement of the particle size distribution by the coarse particle measuring device 22 is high and the range in which the accuracy of the measurement of the particle size distribution by the fine particle measuring device 24 is high. For example, when the laser rangefinder is used as the coarse particle measuring device 22, the particle size distribution can be measured with high accuracy in the particle size range of 10 mm or more. In this case, the range of the particle size distribution of the coarse particles may be set to 10 mm or more, and the range of the particle size distribution of the fine particles may be set to less than 10 mm. In the exampled shown in the present embodiment, the lognormal distribution function is used to represent the cumulative undersize mass fraction as a straight line, but this is not a limitation. Any other function may be used so long as it can represent the particle size distribution of the coke sieved with the sieve 14 using a linear model of the coarse-side particle size distribution and a linear model of the fine-side particle size distribution that border on each other in the vicinity of the sieve mesh size of the sieve 14.

REFERENCE SIGNS LIST 10 particle size distribution measuring apparatus
12 hopper
14 sieve
16 conveyer
20 arithmetic device
22 coarse particle measuring device
24 fine particle measuring device
26 arithmetic unit
28 storage unit
30 coke

The invention claimed is:
1. An apparatus for measuring a particle size distribution of a raw material, the apparatus comprising:
  a coarse particle measuring device that acquires information indicating a particle size distribution of coarse particles;
  a fine particle measuring device that acquires information indicating a particle size distribution of fine particles; and
  an arithmetic device that computes the particle size distribution of the coarse particles using the information indicating the particle size distribution of the coarse particles,
  computes the particle size distribution of the fine particles using the information indicating the particle size distribution of the fine particles, and
  computes an overall particle size distribution of the raw material using the particle size distribution of the coarse particles and the particle size distribution of the fine particles,
  wherein the information indicating the particle size distribution of the fine particles is image data about the raw material, and wherein the particle size distribution of the fine particles is computed using average brightness obtained by averaging the brightness in the image data.

2. An apparatus for measuring a particle size distribution of a raw material, the apparatus comprising:
- a coarse particle measuring device that acquires information indicating a particle size distribution of coarse particles;
- a fine particle measuring device that acquires information indicating a particle size distribution of fine particles; and
- an arithmetic device that computes the particle size distribution of the coarse particles using the information indicating the particle size distribution of the coarse particles,
- computes the particle size distribution of the fine particles using the information indicating the particle size distribution of the fine particles, and
- computes an overall particle size distribution of the raw material using the particle size distribution of the coarse particles and the particle size distribution of the fine particles,
- wherein the fine particle measuring device includes a spectrometric measurement unit that performs spectral analysis on light reflected from the raw material to measure spectral reflectance thereof,
- wherein the fine particle measuring device acquires spectral reflectances at a plurality of wavelengths as the information indicating the particle size distribution of the fine particles, and
- wherein the arithmetic device computes the particle size distribution of the fine particles using scores of predetermined basis vectors obtained by subjecting the spectral reflectances at the plurality of wavelengths to principal component analysis or a partial least squares (PLS) method.

3. A method for measuring a particle size distribution of a raw material, the method comprising:
- a coarse particle measuring step of acquiring information indicating a particle size distribution of coarse particles;
- a fine particle measuring step of acquiring information indicating a particle size distribution of fine particles;
- a coarse particle size distribution computing step of computing the particle size distribution of the coarse particles using the information indicating the particle size distribution of the coarse particles and acquired in the coarse particle measuring step;
- a fine particle size distribution computing step of computing the particle size distribution of the fine particles using the information indicating the particle size distribution of the fine particles and acquired in the fine particle measuring step; and
- a raw material particle size distribution computing step of computing an overall particle size distribution of the raw material using the particle size distribution of the coarse particles and the particle size distribution of the fine particles,
- wherein, in the raw material particle size distribution computing step, the particle size distribution of the coarse particles and the particle size distribution of the fine particles are modeled by respective linear models, and a combination of the linear model of the particle size distribution of the coarse particles and the linear model of the particle size distribution of the fine particles is used to compute the overall particle size distribution of the raw material.

4. A porosity measuring apparatus for measuring the porosity of a raw material stacked in a container,
- the raw material including coarse particles with large particle sizes and fine particles with small particle sizes,
- the porosity measuring apparatus comprising:
- a coarse particle measuring device that measures a particle size distribution of the coarse particles;
- a fine particle measuring device that acquires information indicating a particle size distribution of the fine particles; and
- an arithmetic device that computes the porosity of the raw material stacked in the container using the particle size distribution of the coarse particles that has been measured by the coarse particle measuring device and the particle size distribution of the fine particles that has been measured by the fine particle measuring device,
- wherein the information indicating the particle size distribution of the fine particles is image data about the raw material, and
- wherein the particle size distribution of the fine particles is computed using average brightness obtained by averaging the brightness in the image data.

5. The porosity measuring apparatus according to claim 4,
- wherein the coarse particle measuring device and the fine particle measuring device are disposed above a conveyer that conveys the raw material to the container, and
- wherein the arithmetic device computes the porosity of the raw material stacked in the container.

6. The porosity measuring apparatus according to claim 5,
- wherein the arithmetic device corrects the computed particle size distribution of the coarse particles and the computed particle size distribution of the fine particles such that the computed particle size distribution of the coarse particles and the computed particle size distribution of the fine particles respectively agree with a particle size distribution of the coarse particles that has been measured in advance using a sieve and a particle size distribution of the fine particles that has been measured in advance using a sieve.

7. The porosity measuring apparatus according to claim 6,
- wherein the arithmetic device corrects the particle size distribution of the coarse particles that has been measured by the coarse particle measuring device using a calibration curve for correcting the particle size distribution of the coarse particles and corrects the particle size distribution of the fine particles that has been measured by the fine particle measuring device using a calibration curve for correcting the particle size distribution of the fine particles.

8. The porosity measuring apparatus according to claim 4,
- wherein the arithmetic device corrects the computed particle size distribution of the coarse particles and the computed particle size distribution of the fine particles such that the computed particle size distribution of the coarse particles and the computed particle size distribution of the fine particles respectively agree with a particle size distribution of the coarse particles that has been measured in advance using a sieve and a particle size distribution of the fine particles that has been measured in advance using a sieve.

9. The porosity measuring apparatus according to claim 8,
- wherein the arithmetic device corrects the particle size distribution of the coarse particles that has been measured by the coarse particle measuring device using a calibration curve for correcting the particle size distribution of the coarse particles and corrects the particle size distribution of the fine particles that has been measured by the fine particle measuring device using a calibration curve for correcting the particle size distribution of the fine particles.

10. A porosity measuring apparatus for measuring the porosity of a raw material stacked in a container, the raw material including coarse particles with large particle sizes and fine particles with small particle sizes, the porosity measuring apparatus comprising:

a coarse particle measuring device that measures a particle size distribution of the coarse particles;

a fine particle measuring device that acquires information indicating a particle size distribution of the fine particles; and an arithmetic device that computes the porosity of the raw material stacked in the container using the particle size distribution of the coarse particles that has been measured by the coarse particle measuring device and the particle size distribution of the fine particles that has been measured by the fine particle measuring device, wherein the fine particle measuring device includes a spectrometric measurement unit that performs spectral analysis on light reflected from the raw material to measure spectral reflectance thereof, wherein the fine particle measuring device acquires spectral reflectances at a plurality of wavelengths as the information indicating the particle size distribution of the fine particles, and wherein the arithmetic device computes the particle size distribution of the fine particles using scores of predetermined basis vectors obtained by subjecting the spectral reflectances at the plurality of wavelengths to principal component analysis or a partial least squares (PLS) method.

11. The porosity measuring apparatus according to claim 10, wherein the coarse particle measuring device and the fine particle measuring device are disposed above a conveyer that conveys the raw material to the container, and wherein the arithmetic device computes the porosity of the raw material stacked in the container.

12. The porosity measuring apparatus according to claim 11, wherein the arithmetic device corrects the computed particle size distribution of the coarse particles and the computed particle size distribution of the fine particles such that the computed particle size distribution of the coarse particles and the computed particle size distribution of the fine particles respectively agree with a particle size distribution of the coarse particles that has been measured in advance using a sieve and a particle size distribution of the fine particles that has been measured in advance using a sieve.

13. The porosity measuring apparatus according to claim 12, wherein the arithmetic device corrects the particle size distribution of the coarse particles that has been measured by the coarse particle measuring device using a calibration curve for correcting the particle size distribution of the coarse particles and corrects the particle size distribution of the fine particles that has been measured by the fine particle measuring device using a calibration curve for correcting the particle size distribution of the fine particles.

14. The porosity measuring apparatus according to claim 10, wherein the arithmetic device corrects the computed particle size distribution of the coarse particles and the computed particle size distribution of the fine particles such that the computed particle size distribution of the coarse particles and the computed particle size distribution of the fine particles respectively agree with a particle size distribution of the coarse particles that has been measured in advance using a sieve and a particle size distribution of the fine particles that has been measured in advance using a sieve.

15. The porosity measuring apparatus according to claim 14, wherein the arithmetic device corrects the particle size distribution of the coarse particles that has been measured by the coarse particle measuring device using a calibration curve for correcting the particle size distribution of the coarse particles and corrects the particle size distribution of the fine particles that has been measured by the fine particle measuring device using a calibration curve for correcting the particle size distribution of the fine particles.

* * * * *